United States Patent [19]
Frisone

[11] 4,039,757
[45] Aug. 2, 1977

[54] DIGITAL DATA COMMUNICATION NETWORK AND CONTROL SYSTEM THEREFOR

[75] Inventor: John B. Frisone, Raleigh, N.C.

[73] Assignee: International Business Machines Corporation, Armonk, N.Y.

[21] Appl. No.: 687,729

[22] Filed: May 19, 1976

Related U.S. Application Data

[63] Continuation of Ser. No. 541,541, Jan. 16, 1975, abandoned.

[51] Int. Cl.² ............................................. H04Q 5/00
[52] U.S. Cl. ............................................. 179/15 AL
[58] Field of Search ................... 179/15 AL, 15 AT; 340/147 R, 147 G, 172.5, 150

[56] References Cited
U.S. PATENT DOCUMENTS

| | | | |
|---|---|---|---|
| 3,245,038 | 4/1966 | Stafford | 340/147 |
| 3,405,393 | 10/1968 | Haselwood | 340/172.5 |
| 3,752,932 | 8/1973 | Frisone | 179/15 AL |

Primary Examiner—Kathleen H. Claffy
Assistant Examiner—E. S. Kemeny
Attorney, Agent, or Firm—John B. Frisone

[57] ABSTRACT

A digital data communication network in which bidirectional communications are established between a central station and plurality of remote terminal devices under control of the central station and in which groups of serially connected terminals are connected in parallel to a simplex link for receiving data signals from the central station and in which one group of serially connections stations is selectively connected to a second simplex link for transmitting, in a predetermined sequence, data signals to the central station. Features of the system include line control signals in synchronism, with the signals on the outbound main communications channel, and terminal set transmission directly to the central station with substantially no delay.

13 Claims, 5 Drawing Figures

DIGITAL DATA COMMUNICATION NETWORK AND CONTROL SYSTEM THEREFOR

This is a continuation, of application Ser. No. 541,541 filed Jan. 16, 1975, now abandoned.

FIELD OF THE INVENTION

The invention relates to data communications in general and more particularly to data communication networks and controls therefor.

DESCRIPTION OF THE PRIOR ART

Networks for the communication of digital data between a central facility and a plurality of remote terminal devices are well-known and take many forms. A more common form is the multi-point network operating in either half-duplex or full duplex mode. In a half-duplex multi-point network, a central station is connected to a single physical communication channel and a plurality of terminals are connected in parallel to this same physical channel. Communications on this network may be either in the form of contention communications in which devices listen and if they do not hear any activity on the network, transmit or preferably under control of the central station. The control may take many forms. Typically, however, the central station will send messages preceded by addresses to specific terminals or groups of terminals connected to the communication facility and will authorize or poll specific terminals providing them with an opportunity to transmit messages to the central station. The specific signalling arrangements again may take many forms and it would be impossible to describe the vast multitude in this specification. This type of network has a substantial number of drawbacks, the most important of which is the turnaround time required. When communication changes direction, the line must quiesce and the terminal or device initiating communications must transmit synchronizing sequences to permit the decoding and detection of the data signals transmitted. In environments where short messages are transmitted, the turnaround time can become a significant percentage of the total channel capacity which is not utilized.

A full duplex multipoint network utilizes one facility for carrying messages from the central station to the terminals. The addressing techniques are identical to those described above and a second facility is provided for conducting messages from the devices to the central station. In this environment, polling messages are sent to the terminals from the central station over the outbound channel and the stations are started up and communicate their messages over the inbound channel to the central station. Here again as in the prior case, the inbound line must be synchronized between transmissions from terminals connected thereto.

A modification of the full duplex multi-point system described above is shown in U.S. Pat. No. 3,245,038. This modification permits a substantial improvement in the utilization of the communication facilities. In the patent, a number of concentrators are connected in parallel to a full duplex multipoint network. Polling signals are sent by the central station to the most remote concentrator on the full duplex link. This concentrator transmits its data over the inbound channel and then passes the poll to the next most remote concentrator. The process continues until the nearest concentrator notifies the central station that it has completed transmission. Each of the concentrators is connected to a number of terminal devices. The concentrators scan the lines to these devices and assemble messages from the devices in buffers located within the concentrator. When the buffers are filled, they are assembled and transmitted to the central station whenever the concentrator is polled. The major drawback of this system is the complexity and cost of the concentrator. It requires large amounts of buffering and hardware for scanning the terminals and storing the messages and reformatting the stored messages from each of the terminals into a transmission block suitable for transmission to the central station.

A more recent development utilizes a serial loop network. In this network, the central station is provided with a transmitter and a receiver. The transmitter is connected to the first of a plurality of serially connected terminals and the last of the serially connected terminals is connected to the receiver of the central station. Polling signals and messages may be transmitted at the central station. When a polling signal is received at one of the terminal stations, it interrupts the data following the polling signal and inserts its message on the loop. Thereafter, transmitting a polling signal which permits terminals further down the loop to transmit messages back to the central. This arrangement is particularly advantageous since the turnaround time mentioned above is reduced to zero.

British Pat. No. 1,250,352 published Oct. 20, 1971, describes a serial loop communications network. In this network, all of the terminal devices are connected in a long serial loop. Signals are modulated at the central station and sent over long distance lines to remote locations where demodulation of these signals takes place. The demodulated signals are passed through locally serially connected terminals and then returned to a modulator which transmits the serial signals to another demodulator where the process is repeated. Thus, a limited number of modulators and demodulators may service a larger number of terminal devices. However, the modulators, demodulators and terminals are connected in a single long series loop. While this system does not suffer from the inefficiencies introduced by turnaround time, it is, nevertheless, prone to total disruption when any terminal device or other component fails since the integrity of the loop is destroyed and communications thereover can no longer proceed until the fault is rectified.

The network illustrated in U.S. Pat. No. 3,245,038 does not suffer from such a drawback since a failure at one of the terminal devices connected to the concentrators will have no effect on the communications capability of the other device. In addition, the failure in one of the modulators or demodulators associated with the concentrators will only effect the terminals connected to that concentrator. The remaining portions of the network will remain operative.

U.S. Pat. No. 3,752,932 has a network distribution similar to that of British Pat. No. 1,250,352, however, it employs a different control concept for the network. It also, when used over long distances on leased public carrier communications lines, is prone to network failure when a fault or malfunction occurs at any device.

SUMMARY OF THE INVENTION

The invention contemplates a communications network and control for providing bidirectional data communication between a central control station and a plurality of remote terminal stations comprising: input and output means at said central station, a first communication channel connected to said central station output means for receiving and conveying digital data signals therefrom, a second communication channel connected to said central station input means for conveying digital data signals thereto, a plurality of interface units each having an input means connected to its said first communication channel and an output means connected to said second communication channel, a plurality of terminals each having data signal inputs and outputs connected in series, first control means connecting the interface input means to the input of the first of the series connected terminals, second control means connecting the interface output means to the output of the last terminal of the series connected terminals, said first control means responsive to unique control signals for establishing a connection via the said second control means between the output of the last series connected terminal and the said second communication channel and for providing line control signals to the input of the first series connected terminal for enabling said terminals to transmit digital data signals in sequence.

DESCRIPTION OF THE PREFERRED EMBODIMENTS

Figure 1:
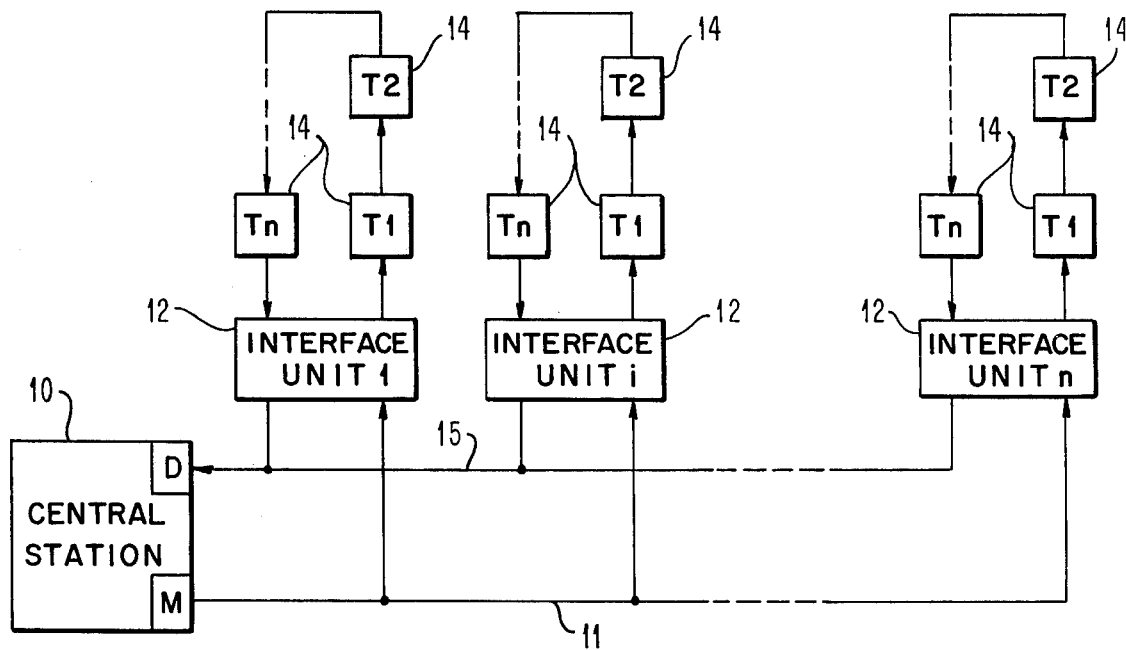
FIG. 1 is a block diagram of a novel communications network constructed according to the invention.

The network shown in FIG. 1 is suitable as a data communication network in many applications. For example, it could be used to connect a central computerized accounting facility of a multi-branched bank via leased communication lines to the various branches which are geographically separated. At each of the geographically separated banks, a plurality of teller terminals and accounting terminals could be connected via private wire through the interface unit to the leased communication lines.

The central station 10 includes a signel modulator M connected to an outbound communications channel 11 for carrying data signals from the central station to a plurality of interface units 12. The interface units labeled IU-1 through IU-n are remotely located and are used to transfer data and control signals from channel 11 to a plurality of serially connected terminals. The number of terminals connected to each interface unit 12 depends on the size and requirements of the particular location and as a practical matter, may vary over a wide range. The interface units 12 are connected to an inbound channel 15 which is connected to a demodulator D located at the central station 10 and signals from a terminal 14 are transmitted in a manner which will be described hereinafter via the interface unit 12 and channel 15 to the demodulator D at the central station 10. The central station 10 may typically include an IBM 3705 Communications Controller with an integrated or separate modem having a modulator and demodulator and an IBM System 370 computer.

Each of the interface units 12 is provided with a unique address. In addition, each of the terminals 14 is also provided with a unique address. The particular format which the address may take is not significant. However, the bit patterns used for encoding the addresses must be unique for each of the devices so that they may be distinguished one from another by a particular device. The components used for implementing the operation being described now are described below in connection with the description of the remaining figures.

Each of the interface units 12 is capable of two modes of operation. In one of these modes which may be considered to be the normal mode of operation for the interface unit, it receives data signals from channel 11 and passes these signals on to the serially connected terminals 14. The signals are passed on from terminal to terminal and eventually are received and passed on by terminal Tn in the serial group. These signals are not permitted to propogate any further through the interface unit in this mode of operation. The data signals or messages will be received by one or more terminals depending upon the address appended thereto. Terminals may respond to specific addresses in which case only one terminal would accept the message or to group addresses in which case one, two or more terminals would accept the message or broadcast addresses in which case, all of the terminals would receive the message. Broadcast address may be utilized to transmit control characters to all of the terminals for controlling their subsequent operations.

In the second mode of operation, the interface units 12 will not pass information from channel 11 to the terminals connected to the particular interface unit. However, they will pass data signals emanating from the terminals through the interface unit to channel 15 where they will be received by the central station 10. In addition, in this mode of operation, interface unit 12 operating in this mode will provide appropriate signals to the first terminal 14 connected thereto for maintaining synchronism and/or maintaining propogation of data transmission by all of the terminals. Only one of the interface units may be in the second mode at any given time.

The description which follows will describe two methods for terminating the second or transmit mode. The second mode is always initiated under control of the central station 10. Once station 10 initiates the second mode of operation at an interface unit 12, it may resume transmitting messages to any terminal connected to one of the other interface units which is in the first or receive mode of operation. The network descriged and the control technique permit efficient utilization of the channel capacity represented by channels 11 and 15. In addition, the network is not subject to a catastrophic failure if one or more devices fail. For example, if one of the terminals connected to one of the interface units 12 fails, the remaining terminals connected to the remaining interface units can continue to receive and transmit data. Only those terminals serially connected with the failing terminal will be impaired in any way. In addition, an impairment in the channels 11 or 15 will impair only those terminals connected to interface units 12 which are physically located beyond the impairment. The terminals between the impairment and the central station 10 can continue normal operation.

Figure 2A:
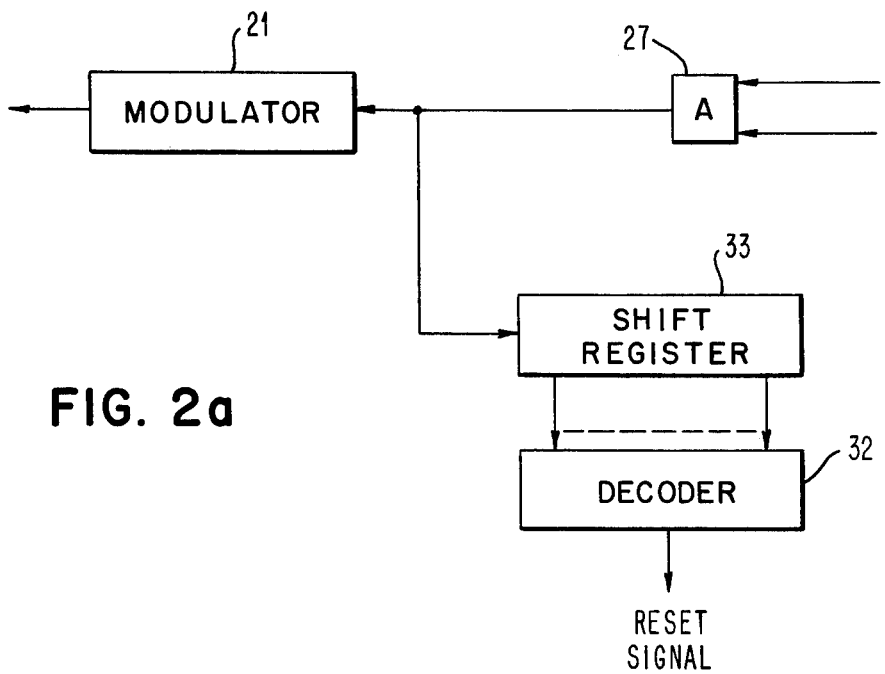
FIG. 2a illustrates a modification of the structure of FIG. 2.
Figure 2:
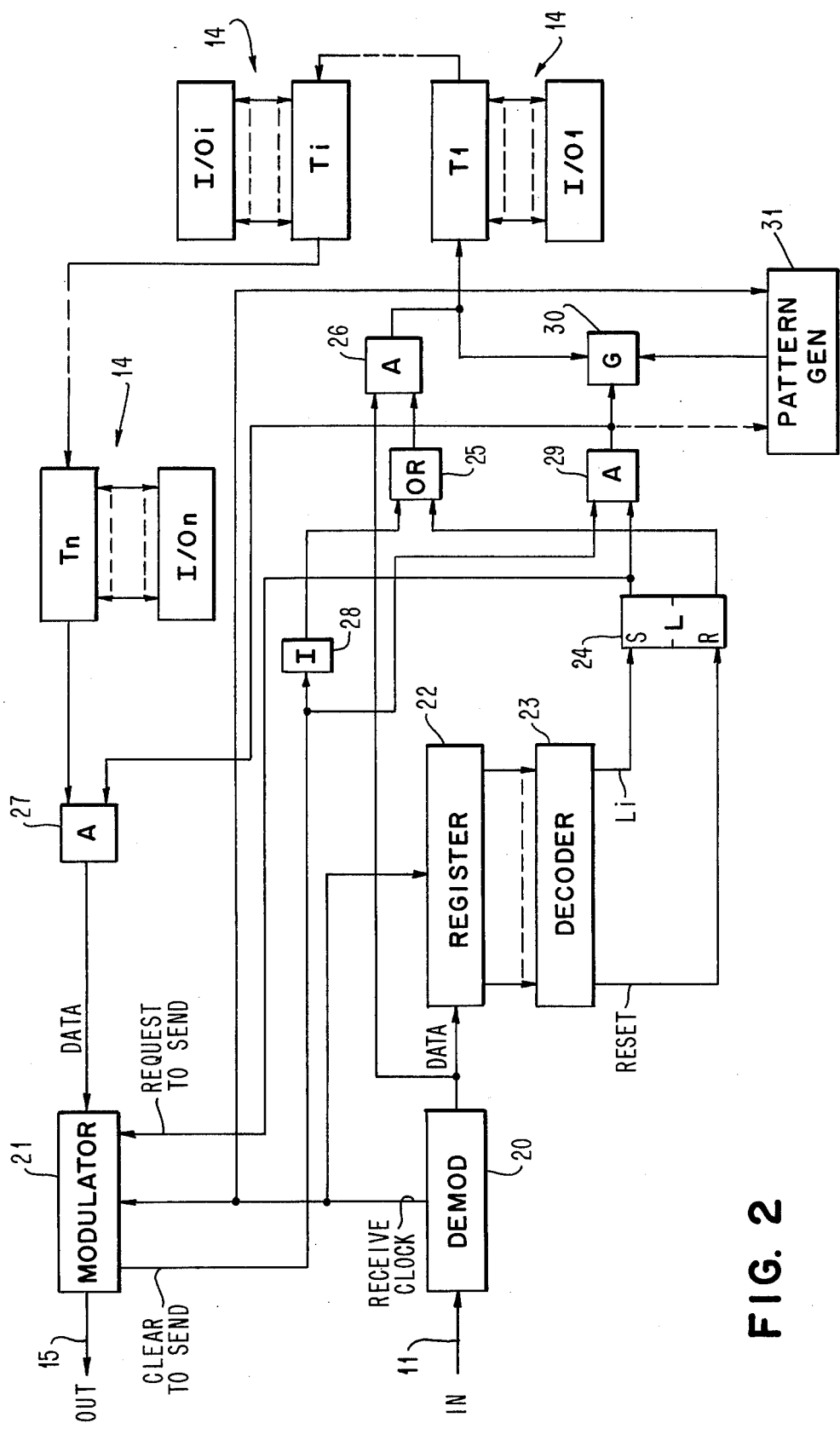
FIG. 2 is a detailed block diagram of a single remote group of terminals and one associated interface unit for connecting the terminals to the serial input output channels of the central station.
Figure 2B:
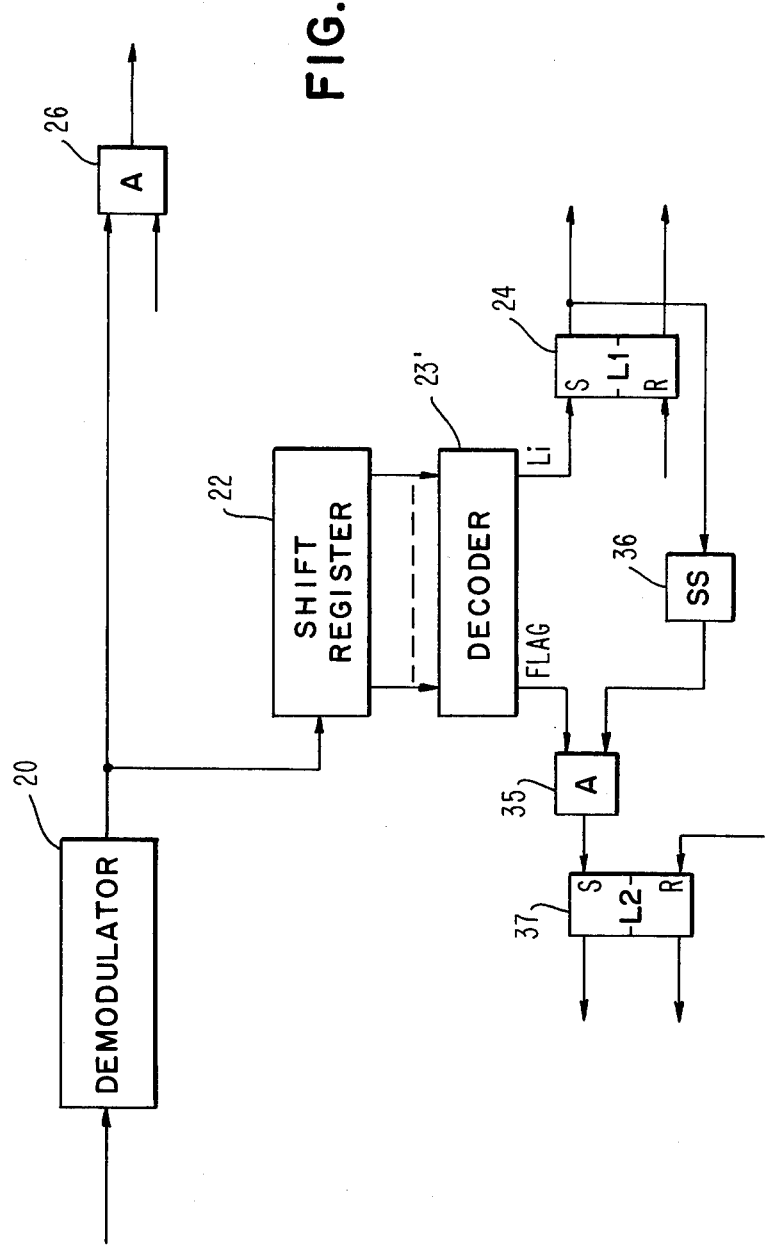
FIG. 2b illustrates a further modification of the structure of FIG. 2.
Figure 2C:
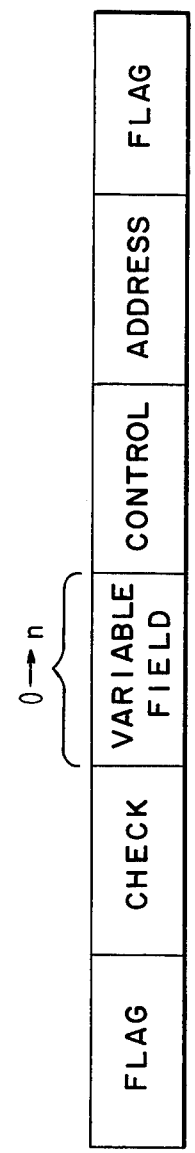
FIG. 2c is a graphical illustration of a signalling format suitable for use with the modification illustrated in FIG. 2b.

Communications from the central station 10, if an IBM 3705 communications controller is utilized, may follow Synchronous Data Link Control procedure in which case the data format for each of the messages will be substantially as shown in FIG. 2c. This format provides a flag signal having 8 bits in the format of a 01111110 at the beginning of the message. The next 8 bit field contains the address of the remote device either receiving or sending the message. The following 8 bit field is a control field which contains configurations of bits meaning different things when sent from the control unit or emanating from a terminal and a variable field following the 8 bit control field which is a multiple of 8 bits and may be 0, followed by a 16 bit field containing a check character. The message block terminates with a flag character similar to the initiating flag character. The check field may or may not be used depending upon the particular control character inserted within the data block.

The interface unit illustrated in FIG. 2 includes a demodulator 20 having its input connected to channel 11 and a modulator 21 having its output connected to communications channel 15. The demodulator 20 and modulator 21 may take many different forms but must be compatible with tthe modulator M and demodulator D utilized at the central station 10.

Data signals on channel 11 are received at the input of demodulator 20 and demodulated. Demodulator 20 provides an output of the data signals at baseband frequency and a receive clock signal. The data signals and the receive clock signals are applied to a register 22 which stores a continuously changing finite past history or epoch of the data signals on channel 11. A decoder circuit 23 continuously examines the contents of register 22 to decode one of two signals. The first signal Li is a unique combination of bits which designate the address of the interface unit. Each of the interface units will decode a different address. When the unique bits Li are decoded, the output from decoder 23 sets a latch 24. The second signal which the decoder 23 looks for is a combination of bits which indicate a reset condition. When this combination of bits is detected, an output is detected which is applied to the reset input of latch 24. Latch 24 is in the reset state when the interface unit and the terminals connected thereto are in the receive mode of operation. The reset output of latch 24 is connected via an OR circuit 25 to one input of and AND gate 26. When the output of OR circuit 25 enables AND gate 26, AND gate 26 passes the baseband data signals supplied by the demodulator 20. These are passed on to the terminal units 14 connected to this interface unit. The signals pass through terminal unit T1 through the intervening terminal units and terminal unit Tn. The signals when AND gate 26 is enabled will not propogate beyond the terminal unit Tn. The output of terminal unit Tn is connected to another AND gate 27 which is only enabled in the second or transmit mode. The receive clock signal from demodulator 20 is applied to modulator 21, thus, the clocks in the demodulator and modulator are operated in synchronism. Modulator 21 provides a conventional clear to send signal when it is ready to send data. This signal line is connected via an inverter circuit 28 to the other input of OR circuit 25. Thus, data signals will be passed through gate 26 to terminals 14 when latch 24 is reset and/or when modulator 21 is not transmitting. The reason for this additional control for gate 26 will become apparent as the description continues.

When the central station 10 wishes to receive data messages from the terminals connected to a particular interface unit such as that illustrated in FIG. 2, it transmits a message block which includes the unique address of the interface unit. The address is received in register 22 of each interface unit, however, only one of the n decoders 23 will provide the appropriate Li signal for setting latch 24. When latch 24 is set, a request to send signal is applied to modulator 21. This causes modulator 21 to turn on and establish synchronism with the demodulator D at station 10 by transmitting an appropriate pattern on channel 15. At the conclusion of the turn on and synchronization period, the modulator 21 provides the clear to send signal. At this time, gate 26 becomes disabled since latch 24 is set and the output of inverter 28 drops. Gate 27 is simultaneously enabled by the output of an AND gate 29 which is controlled by the set output of latch 24 and the clear to send line from modulator 21. The output of gate 29 is also applied to a gate 30 which connects a pattern generator 31 to the input of the first of the series connected terminals 14. Pattern generator 31 also received clock signals from demodulator 20 to assure system wide synchronism.

The particular pattern supplied by generator 31 may take several forms. The terminals 14 and central station 10 may be constructed to operate in the same manner as those disclosed in U.S. Pat. No. 3,752,932 in which case pattern generator 31 will issue a continuous string of signals defining one of two data states such as the binary one. If this mode of operation is selected, the central station may issue the terminal reset or enable signal as defined in the patent by preceding the signal with an "all stations" address which would cause all stations on the network to accept the signal and act thereon or by a group address which would only be recognized by selected stations. In an alternate form, pattern generator 31 could in response to the output from gate 29 issue the terminal eset or enable signal followed by the continuous string of signals defining one of two data states such as the binary one.

Alternatively, the terminals 14 and central station 10 may be designed to operate as described and illustrated in British Pat. No. 1,250,352. In this instance, the pattern generator 31 would, in response to the output of gate 29, provide order characters and synchronizing characters as taught in the above said British patent.

FIG. 2a illustrates a modification of the circuit shown in FIG. 2 in which the end of transmission from the last terminal is detected by a decoder 32 which examines the continuously changing bit content of a past history or epoch of the output of gate 27 which is stored in a register 33 connected thereto. When the end of transmission from the last terminal 14 to transmit is detected by decoding a unique character which will correspond to a portion of the pattern generator output, a reset signal for latch 24 may be locally generated by decoder 32, thus causing the interface to go into receive mode without intervention on the part of the central station 10.

The modification illustrated in FIG. 2b may be used in those instances where a clear to send signal is not available or where a fixed time period is allocated for the modulator 21 to become active. In this modification, the decoder 23' is designed to decode the signal Li which sets latch 24, the outputs of which perform the same function as in FIG. 2. In addition, decoder 23 provides an output when the flag signal illustrated in FIG. 2c is decoded. This output is applied to one input of an AND gate 35 which has its other input connected by a single shot circuit 36 to the set output of latch 24. Thus, a flag detection following the detection of Li, by a predetermined time set by a single shot 36, causes AND gate 35 to provide an output for setting a latch 27. The set output of latch 37 is used in of circuit os FIG. 2 in lieu of the clear to send signal illustrated and described. In addition, the reset output of latch 37 may be used in lieu of the output of inverter 28 in FIG. 2. Latches 24 and 37 may be reset as shown for latch 24 in FIG. 2 or as shown in the modification of FIG. 2a.

While the invention has been shown and described with reference to preferred embodiments thereof, it will be understood by those skilled in the art that various changes in form and detail may be made therein without departing from the spirit and scope of the invention.

What is claimed is:

1. A communications network for providing bidirectional data communication between a central control station and a plurality of remote terminal stations comprising:
    input and output means at said central station;
    a first outbound communication channel connected to said central station output means for receiving and conveying digital data signals therefrom;
    a second inbound communications channel connected to said central station input means for conveying digital data signals thereto;
    a plurality of remote interface units each comprising:
    an input means connected to the said first communication channel and an output means connected to said second communication channel;
    a plurality of terminal means each having data signal inputs and outputs connected in series;
    first control means for connecting the interface input means to the input of the first of the series connected terminals;
    second control means for connecting the interface output means to the output of the last terminal of the series connected terminals;
    said first control means responsive to a first unique control signal for, establishing a data path between the output of the last series connected terminal and the said second channel via said second control means and providing line control signals in synchronism with the signals on the said first outbound communication channel to the input of the first series connected terminal for enabling said serially connected terminals in serial sequence to transmit digital data signals directly with substantially no delay to the central station via any intervening terminals, said second control means, said output means and said second communications channel, and said first control means responsive to a second unique control signal for, disestablishing the data path between the output of the last series connected terminal and the second communications channel, and removing the line control signals from the input to the first series connected terminal.

2. A communications network as set forth in claim 1 in which said central station transmits said first unique control signal, and said second control signal to a one said interface unit via the said outbound communication channel.

3. A communications network as set forth in claim 1 in which said central station transmits said first unique control signal to said interface unit via the said outbound communications channel and means responsive to the signals received from the output of the said last terminal generate said second unique control signal upon detection of a predetermined signal condition.

4. A communications network for providing bidirectional data communication between a central control station and a plurality of remote terminal stations comprising:
    input and output means at said central station;
    a first outbound communication channel connected to said central station output means for receiving and conveying digital data signals therefrom;
    a second inbound communications channel connected to said central station input means for conveying digital data signals thereto;
    a plurality of remote interface units each comprising:
    an input means connected to the said first communication channel and an output means connected to said second communication channel;
    a plurality of terminal means each having data signal inputs and outputs connected in series;
    first control means for selectively connecting the interface input means to the input of the first of the series connected terminals;
    second control means for selectively connecting the interface output means to the input of the last terminal of the series connected terminals;
    said first control means responsive to a first unique control signal received from said first channel via the input means for, activating said output means, establishing a connection via the said second control means between the output of the last series connected terminal and the said output means, selectively interrupting the passage of signals from said input means to the input of said first terminal, and providing line control signals in synchronism with the signals on the said first outbound communications channel to the input of the first series connected terminal for enabling said serially connected terminals to transmit digital data signals in the connected serial sequence directly with substantially no delay to the central station via any intervening terminals, said second control means, said output means, and said second communications channel; and said first control means responsive to a second unique control signal for deactivating said output means, disestablishing the connection via said second control means, removing the line control signals from the input to the first series connected terminal, and reestablishing the passage of the signals from said input means to the input of the said first terminal.

5. A communications network as set forth in claim 4 in which said central station transmits said second unique control signal to a one said interface unit via the said outbound channel.

6. A communications network as set forth in claim 4 in which means responsive to the signals received from the output of the said last terminal generate the said second unique control signal upon detection of a predetermined signal condition.

7. A communications network as set forth in claim 4 in which:
said input means connected to the said first channel includes; a demodulator for providing demodulated data signals received from said first channel and clocking signals;
said output means connected to said second channel includes; a modulator for receiving said clock signals and which in response to a request to send data signal, turns on, executes a synchronization routine, provides a clear to send signal indicating its readiness for operation, and modulates digital input data under control of said clock signals for transmission over the second communications channel;
said first control means includes; gate means for connecting the demodulated signals to the input of the first serially connected terminal; a pattern generator responsive to said clock signals for generating a predetermined bit pattern which when applied to the input of said first terminal causes said serially connected terminals which have data to transmit to transmit said data in the sequence in which they are connected; first means for receiving data signals from said demodulator and decoding said first and second control signals and supplying signals corresponding thereto; second means for applying the signal corresponding to the first control signal to said modulator as a request to send signal; third means responsive to the clear to send signal from said modulator and the signal corresponding to the first control signal for; disabling the said gate means, enabling the said second control means to connect the last series connected terminal to the modulator, and connecting the pattern generator to the input of the first series connected terminal; and means responsive to the signal corresponding to the said second control signal for; disabling the said second means to remove the request to send signal from the modulator, and for disabling the said third means whereby said first control means reverts to its initial operating state.

8. A communicatios network as set forth in claim 4 in which:
said input means connected to the said first channel includes a demodulator for providing demodulated data signals received from said first channel and clocking signals;
said output means connected to said second channel includes; a modulator for receiving said clocking signals and which in response to a request to send data signal turns on, executes a synchronizing routine within a predetermined time and modulates digital input data signals under control of said clock signals for transmission over the second communications channel;
said first control means includes; gate means for connecting the demodulated signals to the input of the first serially connected terminal; a pattern generator responsive to said clock signals for generating a predetermined bit pattern which when applied to the input of said first terminal causes said serially connected terminals which have data to transmit to transmit said data in the sequence in which they are connected; first means for receiving data signals from said demodulator and decoding said first and second control signals and supplying a first signal corresponding to a first portion of said first control signal, a second signal corresponding to a second portion of said first control signal, and a third signal corresponding to said second control signa; second means for applying the first signal corresponding to the first portion of the first control signal to said modulator as a request to send signal; third means responsive to said first and second signals corresponding, respectively, to the first and second portions of the said first control signal for; disabling the said gate means, enabling the said second control means to connect the last series connected terminal to the modulator, and connecting the pattern generator to the input of the first series connected terminal; and means responsive to the third signal corresponding to the second control signal for; disabling the said second means to remove the request to send signal from the modulator, and for disabling said third means whereby said first control means reverts to its initial operating state.

9. A communications network as set forth in claim 4 in which:
said input means connected to the said first channel includes; a demodulator for providing demodulated data signals received from said first channel and clocking signals;
said output means connected to said second channel includes; a modulator for receiving said clock signals and which in response to a request to send data signals, turns on, executes a synchronization routine, povides a clear to send signal indicating its readiness for operation, and modulates digital input data under control of said clock signals for transmission over the second communications channel;
said first control means includes; gate means for connecting the demodulated signals to the input of the first serially connected terminal; a pattern generator responsive to said clock signals for generating a predetermined bit pattern which when applied to the input of said first terminal causes said serially connected terminals which have data to transmit to transmit said data in the sequence in which they are connected; first means for receiving data signals from said demodulator and decoding said first control signal and supplying a signal corresponding thereto; second means for applying the signal corresponding to the first control signal to said modulator as a request to send signal; third means responsive to the clear to send signal from said modulator and the signal corresponding to the first control signal for; disabling the said gate means, enabling the said second control means to connect the last series connected terminal to the modulator, and connecting the pattern generator to the input of the first series connected terminal;
said second control means including detector means for examining the signals supplied by the last of the serially connected terminals for detecting at least a portion of the pattern generator signal and generating said second control signal; and
means responsive to the said control signal for; disabling the said second means to remove the request to send signal from the modulator, and for disabling the said third means whereby said first control means reverts to its initial operating state.

10. A communications network as set forth in claim 4 in which:
said input means connected to the said first channel includes a demodulator for providing demodulated data signals received from said first channel and clocking signals;

said output means connected to said second channel includes; a modulator for receiving said clocking signals and which in response to a request to send data signal turns on, executes a synchronizing routine within a predetermined time and modulates digital input data signals under control of said clock signals for transmission over the second communications channel;

said first control means includes; gate means for connecting the demodulated signals to the input of the first serially connected terminal; a pattern generator responsive to said clock signals for generating a predetermined bit pattern which when applied to the input of said first terminal causes said serially connected terminals which have data to transmit to transmit said data in the sequence in which they are connected; first means for receiving data signals from said demodulator and decoding said first control signal and supplying a first signal corresponding to a first portion of said first control signal, and a second signal corresponding to a second portion of said first control signal, second means for applying the first signal corresponding to the first portion of the first control signal to said modulator as a request to send signal; third means responsive to said first and second signals corresponding, respectively, to the first and second portions of the said first control signal for; disabling the said gate means, enabling the said second control means to connect the last series connected terminal to the modulator, and connecting the pattern generator to the input of the first series connected terminal;

said second control means including detector means for examining the signals supplied by the last of the serially connected terminals for detecting at least a portion of the pattern generator signal and generating said second control signal; and means responsive to the second control signal for; disabling the said second means to remove the request to send signal from the modulator, and for disabling said third means whereby said first control means reverts to its initial operating state.

11. A method of operating a communications network which interconnects a central station to a plurality of groups of serially connected remote terminals, said physical network including an outbound channel for conveying electrical signals from said central station to a plurality of remote interface units each connected to one of said groups of serially connected terminals and an inbound channel connected to each of said interface units for conveying electrical signals from said serially connected terminals via their connected interface unit comprising the steps of:

operating said interface units in a normal receive mode in which the signals on the said outbound channel are transmitted in parallel by each interface unit to the terminals connected thereto;

generating and transmitting a command signal directed to one only of said interface units for causing said directed unit to switch to a transmit mode;

said one directed interface unit in said transmit mode transmitting command signals in synchronism with the signals on said outbound channel to the serially connected terminals for enabling said terminals to transmit data signals in a serial manner to the said interface unit; and contemporaneously and substantially without intermediate storage transmitting the data signals from the connected terminals to the said inbound channel.

12. The method set forth in claim 11 in which said central station examines the data signals received from the inbound channel and generates and transmits a reset signal to the interface unit in the transmit mode which causes said interface unit to return to the receive mode when the central station detects a completion of data transmission.

13. The method set forth in claim 11 in which said interface unit in the transmit mode examines the data received from the serially connected terminals and resumes the receive mode when it detects a completion of data transmission from said serially connected terminals.

* * * * *